United States Patent
Kauppila

(10) Patent No.: US 7,680,484 B2
(45) Date of Patent: Mar. 16, 2010

(54) SYSTEM AND METHOD FOR PERFORMING WIRELESS REMOTE MONITORING

(75) Inventor: Edwin A. Kauppila, P.O. Box 1641, Nevada City, CA (US) 95959

(73) Assignee: Edwin A. Kauppila, Nevada City, CA (US)

( * ) Notice: Subject to any disclaimer, the term of this patent is extended or adjusted under 35 U.S.C. 154(b) by 1537 days.

(21) Appl. No.: 10/779,413

(22) Filed: Feb. 13, 2004

(65) Prior Publication Data

US 2005/0181762 A1  Aug. 18, 2005

(51) Int. Cl.
*H04M 3/16* (2006.01)

(52) U.S. Cl. .................... 455/410; 370/338

(58) Field of Classification Search ............... 455/410, 455/411; 370/338; 348/143, 148, 552; 382/103, 382/104, 117
See application file for complete search history.

(56) References Cited

U.S. PATENT DOCUMENTS

| | | | |
|---|---|---|---|
| 5,768,513 A | 6/1998 | Kuthyar et al. | |
| 5,893,031 A | 4/1999 | Hoogerwerf et al. | |
| 6,208,445 B1 | 3/2001 | Reime | |
| 6,332,075 B1 * | 12/2001 | Verdonk | 455/408 |
| 6,385,772 B1 | 5/2002 | Courtney | |
| 6,392,692 B1 * | 5/2002 | Monroe | 348/143 |
| 6,459,906 B1 * | 10/2002 | Yang | 455/556.1 |
| 6,519,241 B1 | 2/2003 | Theimer | |
| 6,556,586 B1 | 4/2003 | Sipila | |
| 6,567,501 B1 | 5/2003 | Pernu et al. | |
| 6,600,732 B1 | 7/2003 | Sevanto et al. | |
| 6,603,977 B1 | 8/2003 | Walsh et al. | |
| 6,704,040 B2 * | 3/2004 | Sato | 348/14.02 |
| 2004/0132489 A1 * | 7/2004 | Ryley et al. | 455/556.1 |
| 2004/0171371 A1 * | 9/2004 | Paul | 455/414.4 |
| 2004/0266449 A1 * | 12/2004 | Smetters et al. | 455/452.1 |
| 2005/0003797 A1 * | 1/2005 | Baldwin | 455/404.1 |
| 2005/0078195 A1 * | 4/2005 | VanWagner | 348/231.3 |

* cited by examiner

*Primary Examiner*—Sam Bhattacharya
(74) *Attorney, Agent, or Firm*—Steven L. Nichols

(57) ABSTRACT

A method for transmitting surveillance image data over a wireless network includes associating an authorized identification with a surveillance device, and transmitting the surveillance image data and the authorized identification to a mobile telecommunications switching station.

8 Claims, 6 Drawing Sheets

SYSTEM AND METHOD FOR PERFORMING WIRELESS REMOTE MONITORING

BACKGROUND

Surveillance or monitoring apparatuses often use at least one video camera allowing surveillance images to be viewed at a remote location. For example, an industrial facility may have several video cameras at various locations throughout the facility, each camera being communicatively coupled to a respective video screen at a central security station operated by one or more guards.

More recently, video cameras have been developed that can be coupled to a computer hosting any number of software programs capable of converting video images received from the video cameras into a document in hypertext mark-up language (HTML) format, or in other words a document compatible with the Internet standard known as the world wide web (www). Further, personal communication devices such as cellular phones, pagers, and personal digital assistants (PDAs) are becoming increasingly popular commercial products, as wireless communication technology becomes widespread and affordable. Additionally, a number of cellular phone manufacturers are manufacturing and selling camera phones or other smart phones having video displays capable of displaying received images or camera capabilities capable of generating desired images.

Moreover, home security systems have become more common. However, even the most sophisticated home security systems are limited by rudimentary provisions for remote access by the property owner. Further, false alarms are relatively common with traditional home security systems. Even if the owner is made aware of an alarm, there is no convenient and cost-effective way for the owner to determine whether the alarm is a false alarm. For example, existing systems may notify an owner of a possible break-in or other event through an automated phone call or page message, but the owner has no way of verifying whether there is a genuine emergency or merely a false alarm.

While these existing monitoring systems have been generally adequate for their intended purposes, they have not been satisfactory in all respects. For example, and as mentioned above, even if an owner is notified by a page or telephone call of a problem or other event of interest, there is no convenient way for the owner to determine whether the event represents a true problem or just a false alarm, still less from virtually any remote location. Further, existing systems do not allow for convenient monitoring of locations outside traditional cell phone service areas. Moreover, traditional methods that incorporate the Internet for data transmission may suffer from network slowdowns and crashes that often accompany data transmission over the Internet.

SUMMARY

A method for transmitting surveillance image data over a wireless network includes associating an authorized identification with a surveillance device, and transmitting the surveillance image data and the authorized identification to a mobile telecommunications switching station.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary method and apparatus for remotely monitoring an area of interest is described herein. More specifically, a remote monitoring system includes an image generating device having an electronic serial number or other identifier authorizing the monitoring system as an approved source of images transmitted to a wireless communication device. In conjunction with the previously mentioned apparatus, a method is described for allowing access to a user of generated images on a cellular phone regardless of the cell phone service provider. The present specification discloses the components and various exemplary methods for their application and implementation.

As used in this specification and in the appended claims, the term "cellular phone" is meant to be understood as any wireless phone that does not physically connect with a phone cable. Similarly, a "service provider" is meant to be understood as any company that provides wireless communication device users with services and subscriptions to wireless networks.

In the following description, for purposes of explanation, numerous specific details are set forth in order to provide a thorough understanding of the present system and method for remotely monitoring an area of interest. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
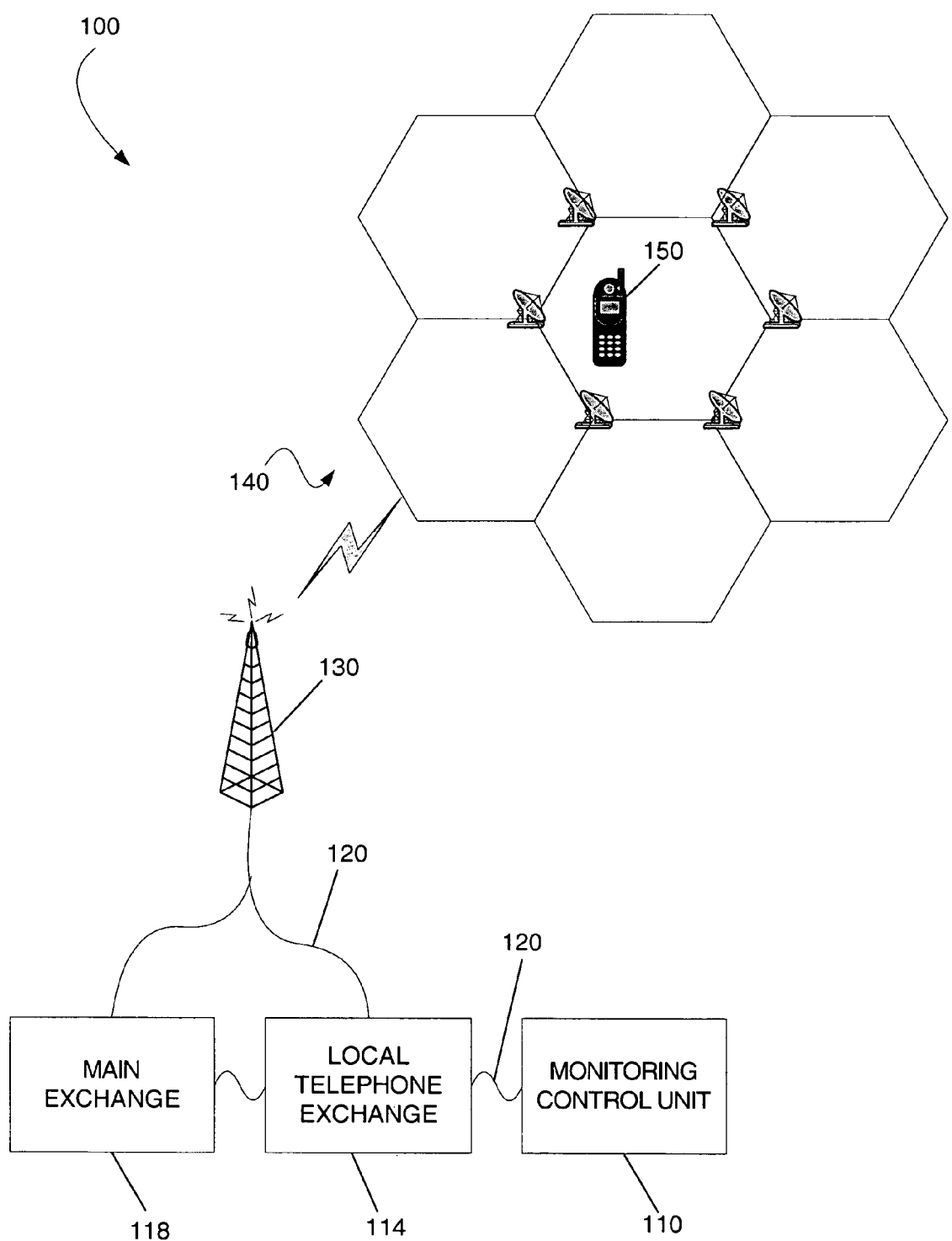
FIG. 1 is a simple block diagram illustrating a wireless communication and monitoring system according to one exemplary embodiment.

FIG. 1 illustrates an exemplary system (100) that may incorporate the present method for remotely monitoring an area of interest. As illustrated in FIG. 1, the exemplary system (100) includes a monitoring control unit (110) coupled to a standard telephone line (120). The standard telephone line is subsequently coupled to a local telephone exchange (114) and/or a main exchange (116) which are in turn communicatively coupled to a mobile telecommunications switching office (130) through the standard telephone line (120). The mobile telecommunications switching office (130) transmits wireless signals over a radio frequency (RF) link (140) to a wireless communication device (150).

As shown in FIG. 1, the monitoring control unit (110) is communicatively coupled to a mobile telecommunications switching office (130) through a standard telephone line (120) and a local (114) and/or main telephone exchange (118). The standard telephone line (120) communicatively coupling the monitoring control unit (110) to the local telephone exchange (114), the main telephone exchange (118), and the mobile telecommunications switching office (130) may be any traditionally used telephone cable system including, but in no way limited to a plain old telephone system (POTS), a public switched telephone network (PSTN), or an integrated services digital network (ISDN) including a public land mobile network (PLMN). Structure of the standard telephone line may include, but is in no way limited to, copper twisted pair telephone line or fiber optic cable.

The local telephone exchange (114) is a central communication facility connecting all the phones in a specified geographic region through the standard telephone line (120). Similarly, the main telephone exchange (118) is a central communication facility covering a larger geographic location than the local telephone exchange (114). While the communication link between the main telephone exchange (118) and the mobile telecommunications switching office (130) is illustrated as a standard telephone line (120), the received data may then be transmitted to the mobile telecommunications switching office by any number of transmission means including, but in no way limited to, radio frequency transmission or local area network (LAN) line transmission.

The local (114) and/or main telephone exchange (118) is communicatively coupled, according to one exemplary embodiment, to a mobile telecommunications switching office (130) or other wireless signal transmitting device through the standard telephone line (120) as illustrated in FIG. 1. According to one exemplary embodiment, the mobile telecommunications switching office (130) is configured to receive a data signal from the standard telephone line (120), convert that signal into a radio frequency signal, and transmit that RF signal over a traditional RF link (140) to a receptive wireless communication device (150). The RF link (140) used as the medium of transmission may include, but is in no way limited to, a number of relays such as cell towers or subsequent mobile telecommunication switching offices configured to receive broadcast signals and transmit the received signals to a desired wireless communication device (150).

As illustrated in FIG. 1, the wireless communication device (150) is configured to receive any message addressed thereto that has been transmitted over the RF link (140). According to one exemplary embodiment, the wireless communication device (150) includes a cellular phone having image reception and display capabilities. Alternatively, the wireless communication device may be any addressable electrical communication device configured to receive image data over an RF link from the monitoring control unit (110) including, but in no way limited to, a cellular phone, a personal digital assistant (PDA), a laptop, a tablet computer, and the like. The wireless communication device (150), regardless of the form it takes, includes a display screed capable of displaying a two-dimensional image. Additionally, the wireless communication device (150) may also include a plurality of buttons or keys that may then be used to communicate commands to the monitoring control unit (110). Moreover, the wireless communication device (150) also includes voice mail and/or text message capabilities sufficient to receive and store a specified alarm signal. While any of the above-mentioned wireless communication devices (150) may be used in conjunction with the present monitoring control unit (110) to perform the present method, the present system and method will be described hereafter, for ease of explanation only, in the context of a cellular telephone wireless communication device (150).

Figure 2:
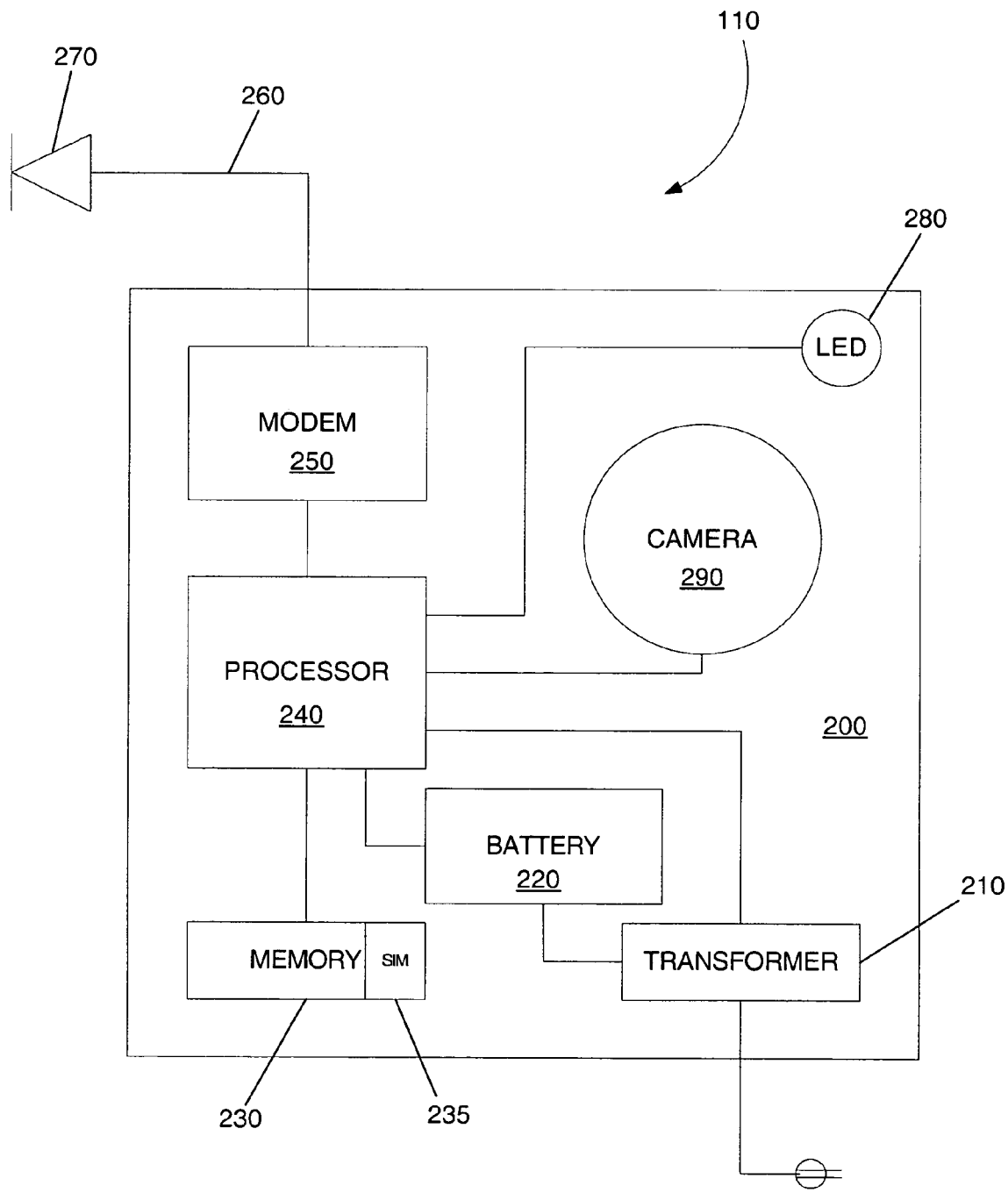
FIG. 2 is a simple block diagram illustrating the components of a wireless monitoring system according to one exemplary embodiment.

FIG. 2 further illustrates a number of components of the monitoring control unit (110) according to one exemplary embodiment. The monitoring control unit (110) is used to monitor activities in one or more regions or areas of interest. For example, the monitoring control unit (110) might be used at a residence to monitor activity in one or more rooms, in the yard, at the front door, and/or in the driveway. It could also be used for monitoring one or more areas in a commercial or industrial facility.

As shown in FIG. 2, the monitoring control unit (110) may include, but is in no way limited to, a housing (200) containing a processor (240). Additionally, a number of components may be communicatively coupled to the processor (240) including a data storage device (230), a power source including a battery (220) and a transformer (210) configured to transform 110V power received from a standard outlet, an activation indicator (280), a modem (250) leading to a line out (260) that is coupled to a standard telephone line (270), and an image collection device (290). The individual components of the monitoring control unit (110) will now be described in further detail below.

As illustrated in FIG. 2, the components of the monitoring control unit (110) are disposed inside a housing (200). The housing (200) of the present monitoring control unit (110) is configured to protect the internal components of the monitoring control unit (110) from impact and/or moisture, thereby assuring their proper function. According to one exemplary embodiment, the housing (200) may be made out of any impact resistant material including, but in no way limited to, metal or plastic.

The processor (240) illustrated in FIG. 2 is the primary chip of the monitoring control unit (110) that oversees the operation of all the other coupled components of the system. The processor (240) interprets received signals, executes instructions, performs computations, and otherwise controls the major functions of the monitoring control unit (110). Additionally, the processor (240) may be configured to perform time and day stamp operations on received images. According to one exemplary embodiment, the processor (240) of the monitoring control unit (110) may be, but is in no way limited to, an application-specific integrated circuit or a general integrated circuit.

The data storage device (230) illustrated in FIG. 2 is communicatively coupled to and may be accessed by the processor (240). The data storage device (230) is configured to store a number of images collected by the camera (290) as well as additional information produced by the processor (240) or commands to be performed by the processor (240) in response to specified conditions. According to one exemplary embodiment, the memory storage device (230) illustrated in FIG. 2 may be any machine accessible memory storage unit including, but in no way limited to, random access memory (RAM), magnetic RAM, or flash memory. Additionally, the data storage device may also include a read only memory (ROM) in the form of a subscriber identity module (SIM) card (235). According to one exemplary embodiment, the SIM card (235) is a small printed circuit board inserted in the monitoring control unit (110) that is accessed by a service provider when signing on as a subscriber. According to one exemplary embodiment, the data storage device (230) includes data that identifies the caller to a network service provider during a call in the form of a binary electronic serial number (ESN) as will be explained in further detail below. A number of control instructions may also be included in the ROM of the data storage device (230) at the time of manufacture. According to the present exemplary embodiment, the SIM card (235) contains a ROM section that includes information detailing various image transmission methods used by one or more service providers. Additionally, the SIM card (235) may also include programmable memory, or RAM, configured to store a number that may be used to access a mobile communication device (150) and/or a personal directory of numbers. The card can be any shape or size including a small plug-in type or credit-card size.

Power is supplied to the components of the monitoring control unit (110) by a power supply in the form of a battery (220) and a transformer (210) coupled to a 110 volt power source. According to one exemplary embodiment, a direct current (DC) battery is included in the monitoring control unit (110) as an emergency resource to provide power to the monitoring control unit in the case of intentional or unanticipated losses of power. However, during typical operation, the present monitoring control unit (110) is configured to receive power via a traditional 110 volt power outlet.

As illustrated in FIG. 2, an activation indicator (280) may also be included in the monitoring control unit (110). The activation indicator (280) may be provided to inform a user when the monitoring control unit is armed and/or to indicate a reception of power to the internal components. According to one exemplary embodiment illustrated in FIG. 2, the activation indicator includes, but is in no way limited to, a light-emitting diode (LED).

As illustrated in FIG. 2, the present exemplary monitoring control unit (110) also includes a modem (250) communicatively coupled to the processor (240). According to one exemplary embodiment, the modem (250) is configured to modulate digital signals such as images collected by the camera (290) into analog signals representing the collected digital signals that may then be transmitted through the line out (260) connection and over a standard telephone line (270) to the nearest mobile telecommunications switching office (130; FIG. 1) in the form of frames or packets of data. Additionally, the modem (250) may be configured to demodulate incoming analog signals and convert them into a digital signal.

As noted previously, the camera (290) illustrated in FIG. 2 is configured to collect images of a designated area. According to one exemplary embodiment, the camera (290) is a charge coupled device (CCD) sensor, and a zoom lens assembly (not shown) for adjusting the field-of-view of the image focused on by the CCD sensor. Additionally, the image collection device (110) may also include a sensor (not shown) that can detect an event of interest in an area monitored by the image collection device (110). According to the present exemplary embodiment, the sensor may be a motion detecting sensor similar to those used in systems which automatically open doors for customers at retail establishments. Alternatively the sensor (not shown) may be a passive infrared sensor capable of detecting a heat source, such as a human or an animal, within an area being monitored.

Alternatively, according to one exemplary embodiment, the sensor (not shown) may be omitted by using the processor (240), in conjunction with the camera (290), to detect the occurrence of an event of interest by appropriate processing of the raw video images received from the camera. According to this exemplary embodiment, when the monitoring control unit (110) is armed and monitoring a desired location, subsequently collected images are compared to prior reference images. If a threshold number of pixels sufficiently differ, a change will be noted and the processor (240) will indicate the occurrence of an event of interest.

While FIGS. 1 and 2 illustrate a number of components of the present system and method, additional components may be included in the present system and method. According to one exemplary embodiment, the present monitoring control unit (110) may also include external terminals configured to enable the coupling of closed or open alarm sensors that may be used in conjunction with, or in place of the above-mentioned optical sensors. Additionally, the present monitoring control unit (110) may also include an external power outlet disposed on the surface of the monitoring control unit. According to this exemplary embodiment, an external light source may be coupled to the monitoring control unit (110) to further facilitate the generation of surveillance images. The external power outlet may also be selectively provided power in response to received sensor signals. Moreover, an ambient light source, an ultraviolet light source, or other low light sources may be present on the monitoring control unit (110) to enable night vision, infrared, or ultraviolet surveillance.

The independent components of the exemplary monitoring control unit (110) illustrated in FIG. 2 may function together to generate video images via the camera (290) and carry out image processing sufficient to allow transmission and display of the camera generated image to a wireless communication device (150; FIG. 1) through the monitoring signal transmission path (100; FIG. 1) illustrated in FIG. 1. A number of exemplary methods of performing the above-mentioned transmission will be given below.

Exemplary Implementation and Operation

Figure 3:
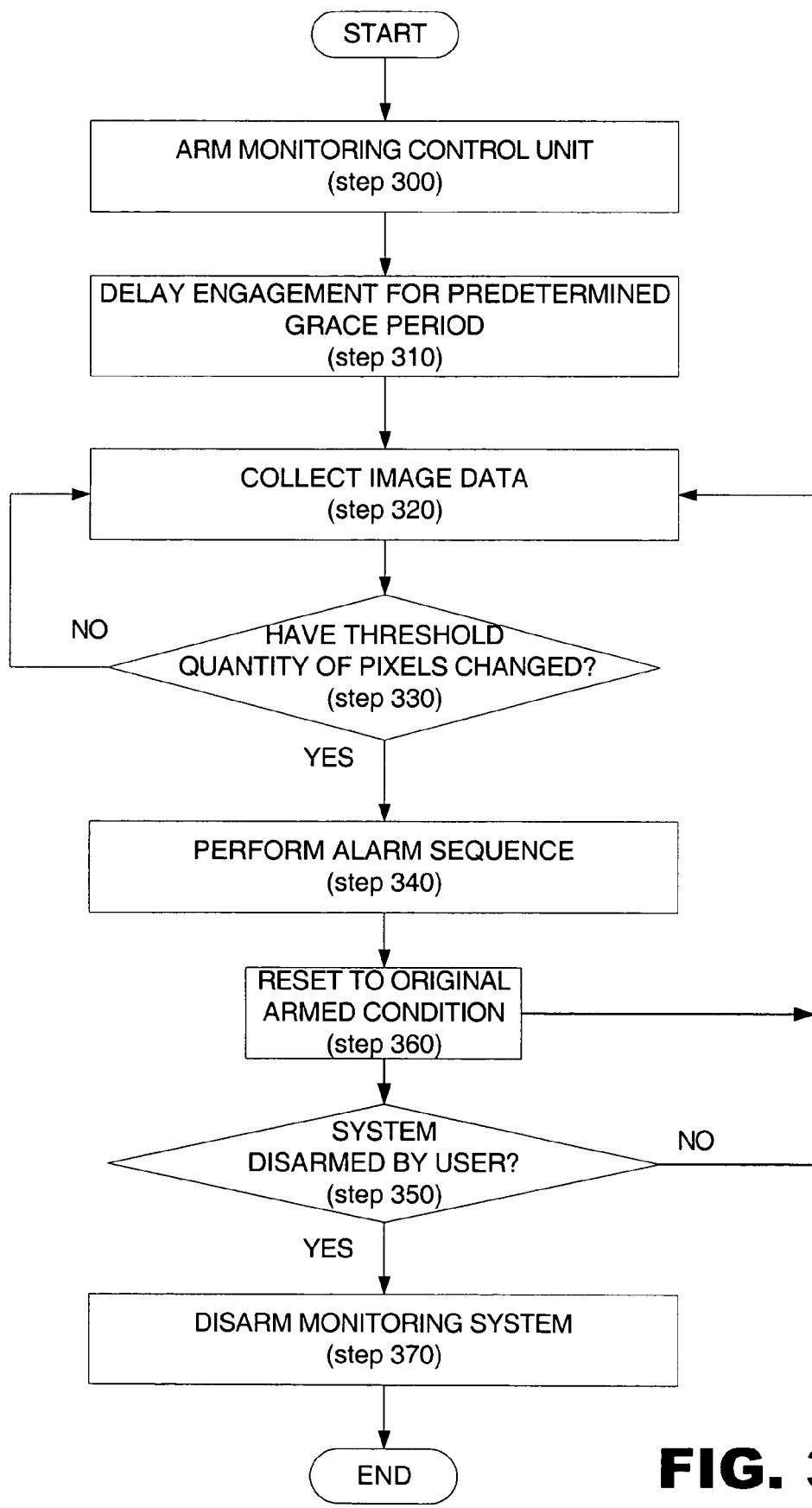
FIG. 3 is a flow chart illustrating a method for remotely monitoring a desired location according to one exemplary embodiment.

FIG. 3 illustrates a method for using the monitoring control unit described above to monitor an area of interest according to one exemplary embodiment. As illustrated in FIG. 3, the present method begins by arming the monitoring control unit (step 300). Once the monitoring control unit is armed, activation of the sensor is delayed for a pre-determined grace period (step 310). Once the pre-determined grace period has lapsed, the monitoring control unit begins to collect image data of a desired location using the camera (step 320) or other sensor. During the data collection, the processor may compare temporally close images to determine if a threshold quantity of pixels has changed thereby indicating an event of interest (step 330). If an event of interest has not been indicated (NO, step 330), the monitoring control unit continues to collect image data of the desired location (step 320). If, however, sufficient pixels have changed to indicate an event of interest (YES, step 330), an alarm sequence is performed (step 340). After the alarm sequence is performed (step 340), the monitoring control unit determines if a disarm signal has been transmitted by the user (step 350). If the monitoring control unit does not detect a disarm signal (NO, step 350), then the monitoring control unit is reset to its original armed condition (step 360) where it continues to collect image data (step 320). If, however, a disarm signal is received by the monitoring control unit (YES, step 350), the monitoring control unit is shut down (step 370). The above-mentioned method will be explained in further detail below.

As illustrated in FIG. 3, the first step in the exemplary embodiment is the arming of the monitoring control unit (step 300). Arming of the monitoring control unit may be performed by a user through a number of methods. According to one exemplary embodiment, arming of the monitoring control unit may be performed at the physical location of the monitoring control unit by pressing an externally accessible button or switch. Alternatively, the monitoring control unit may be armed from a remote location by the user. According to this exemplary embodiment, the user may dial into the monitoring control unit through the standard telephone line (270; FIG. 2) and enter a numeric code initiating an arming command to the monitoring control unit. According to one exemplary embodiment, once the monitoring control unit has been armed, a user may be notified of the activation through an operation of the activation indicator (280; FIG. 2). According to one exemplary embodiment, when the monitoring control unit is armed, the activation indicator is illuminated. Alternatively, the activation indicator may be illuminated when the monitoring control unit is not armed. According to this embodiment, when the monitoring control unit is armed, the activation indicator is not illuminated in order to reduce attention drawn to the monitoring control unit.

Once the monitoring control unit has been armed as illustrated in FIG. 3, a timer is initiated so as to delay the activation of the sensor or other area monitoring device for a predetermined grace period (step 310). By allowing a programmable grace period between arming and monitoring, a user is allowed time to exit a designated location without indicating an event of interest. According to one exemplary embodiment, the designated grace period may be selected by the user and varied from a number of seconds to minutes. Alternatively, the designated grace period may be programmed into the monitoring control unit by the manufacturer.

Once the designated grace period has lapsed after an activation procedure, the camera or other sensor begins to generate images of the designated area (step 320). According to one exemplary embodiment, the generation of images of the designated area (step 320) is performed by a CCD or other camera (290; FIG. 2). The camera (290; FIG. 2) may periodically generate images of the area of interest. According to one exemplary embodiment, the camera (290; FIG. 2) generates images of the area of interest approximately every second or a fraction thereof to detect any event of interest. According to the exemplary embodiment illustrated in FIG. 3, the camera (290; FIG. 2) generates images of the area of interest and compares subsequently generated images to detect an event of interest (step 330).

According to one exemplary embodiment, if a pre-determined quantity of pixels in the generated image differ (YES, step 330), an event of interest is detected. If, however, the threshold quantity of pixels have not changed (NO, step 330), no event of interest is detected and the monitoring control unit (110; FIG. 2) continues to collect image data (step 320). According to one exemplary embodiment, the threshold quantity of pixels indicating an event of interest may be modified by the user to vary the sensitivity of the monitoring control unit (110; FIG. 2) in detecting an event of interest.

Figure 4:
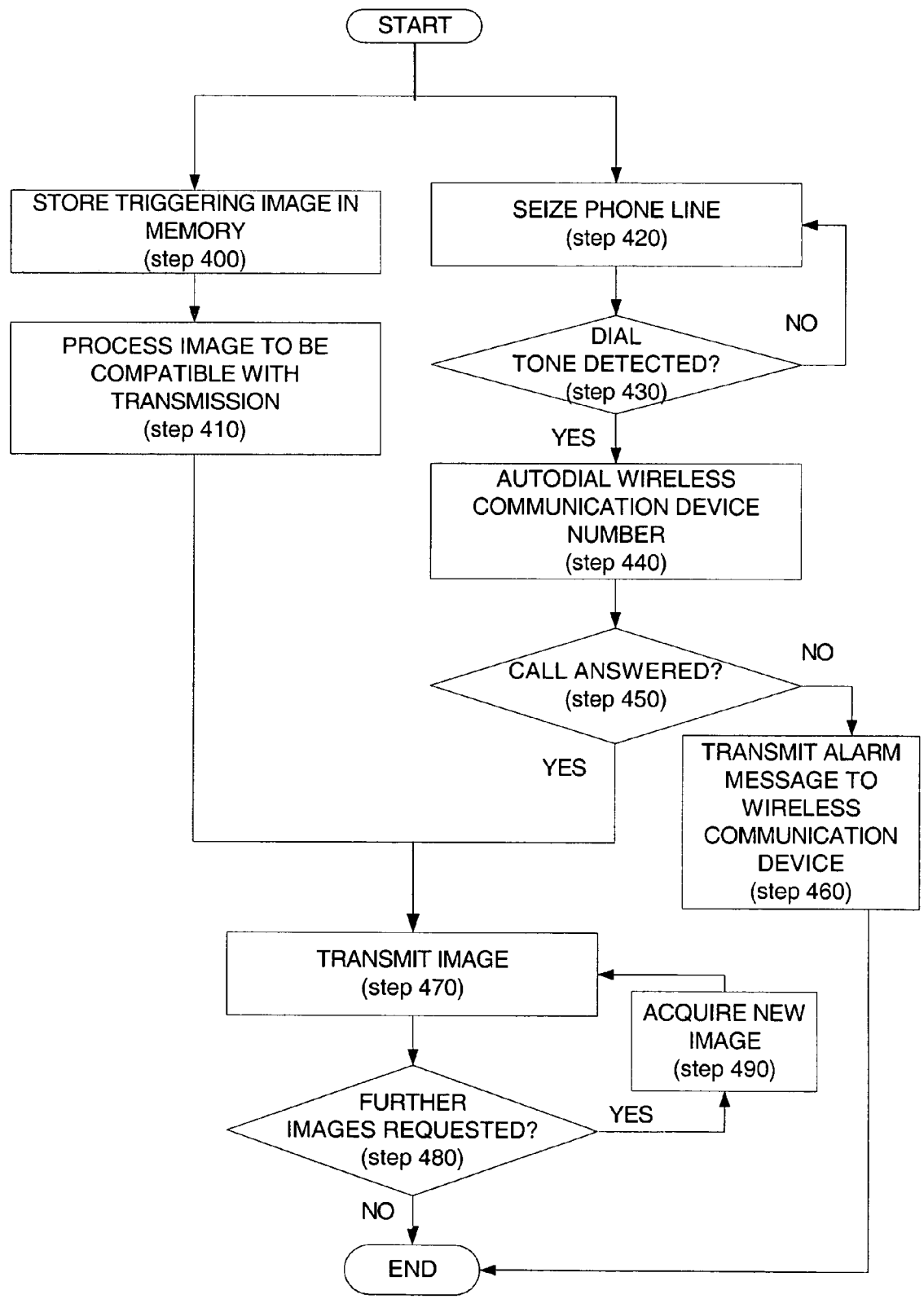
FIG. 4 is a flow chart illustrating an alarm sequence according to one exemplary embodiment.

If sufficient generated pixels have been modified in subsequently generated images to indicate an event of interest (YES, step 330), an alarm sequence is performed (step 340) aimed at notifying a user of the event of interest. FIG. 4 illustrates an alarm sequence according to one exemplary embodiment. As illustrated in FIG. 4, when the alarm sequence is performed, the generated image that caused the initiation of the alarm sequence, as well as subsequently generated images, are stored in a data storage device (230; FIG. 2) of the monitoring control unit (step 400). Once stored in memory, the triggering image is processed to be compatible with a transmission over a standard telephone line (step 410). According to one exemplary embodiment, the triggering image, as well as subsequently generated images, is digitally stored as a document in hyper text markup language (HTML) format. Alternatively, the triggering image may be digitally stored in a joint photographic experts group (JPEG) format and/or compressed according to a number of known data compression methods such as, but in no way limited to, moving pictures experts group (MPEG) 4.

According to the exemplary embodiment illustrated in FIG. 4, the monitoring control unit (110; FIG. 2) attempts to connect with the wireless communication device (150; FIG. 1) during the above-mentioned image storage and processing. As illustrated in FIG. 4, the connection with the wireless communication device begins by seizing the telephone line after the alarm sequence has been triggered (step 420). This seizing of the phone line prevents incoming calls from disturbing the image transmission process. Once the phone line is seized, the monitoring control unit attempts to detect a dial tone (step 430). If no dial tone is detected (NO, step 430), the monitoring control unit (110; FIG. 2) continues to seize the phone line (step 420) and detect a dial tone (step 430). However, when a dial tone is detected (YES, step 430), the monitoring control unit automatically dials the wireless communication device number (step 440). Automatic dialing of the wireless communication number may be performed by accessing the wireless communication device number stored in the data storage device (230; FIG. 2) of the monitoring control unit (110; FIG. 2).

Once dialed, the call is transmitted from the monitoring control unit (110; FIG. 1), through the standard telephone line (120; FIG. 1) to a local telephone exchange (114) or a main exchange (118) before being transmitted to the mobile telecommunications switching office (130; FIG. 1) and over the RF link (140; FIG. 1) to the wireless communication device (150; FIG. 1). Once the wireless communication device has been dialed, the monitoring control unit waits for the call to be answered (step 450). If the call is not answered by the user (NO, step 450), an alert signal is transmitted (step 460) to the wireless communication device indicating that an event of interest has occurred. According to one exemplary embodiment, the call may be considered unanswered if the monitoring control unit reaches the message inbox of the wireless communication device. Regardless of the method for detecting an answer, if the call is made, or not answered, the alert signal is sent. The alert signal transmitted in the event of an unanswered call may be any number of messages including, but in no way limited to, an audible message left in the message inbox of the wireless communication device, an alert signal transmitted to an alternative wireless communication device such as a pager, or a call to a monitoring service or law enforcement agency. In order to assure that the alert signal will be accepted by the wireless communication device (150; FIG. 1) the alert signal is not necessarily an image or digital transmission. Rather, it may include an audible signal, a text message, etc.

When the triggering image has been appropriately processed (step 410) and the call to the wireless communication device has been successful (YES, step 450), the processor (240; FIG. 2) of the monitoring control unit (110; FIG. 2) uses the modem (250; FIG. 2) to modulate and transmit the initial triggering image one or more times to the wireless communication device (step 470). The triggering image is transmitted to the wireless communication device so that the operator can view the triggering image and determine what is happening in the monitored area. Image data manipulation may be performed by a number of network components, such as the mobile telecommunications switching office (130; FIG. 1) or the local telephone exchange (114; FIG. 10, before the image reaches the desired wireless communication device (150).

After receiving the image, the user may request subsequently collected images to further determine the conditions of the monitored area (step 480). If additional images are requested (YES; step 480), subsequent images are accessed in the data storage device (step 490) and transmitted to the wireless communication device (step 470). If, however, no further images are requested by the user (NO, step 480), the alarm sequence terminates and the monitoring control unit is reset (step 360; FIG. 3). Additionally, the monitoring control system may be disarmed (step 370; FIG. 3) by the user using merely audible tones over the communication link.

Figure 5:
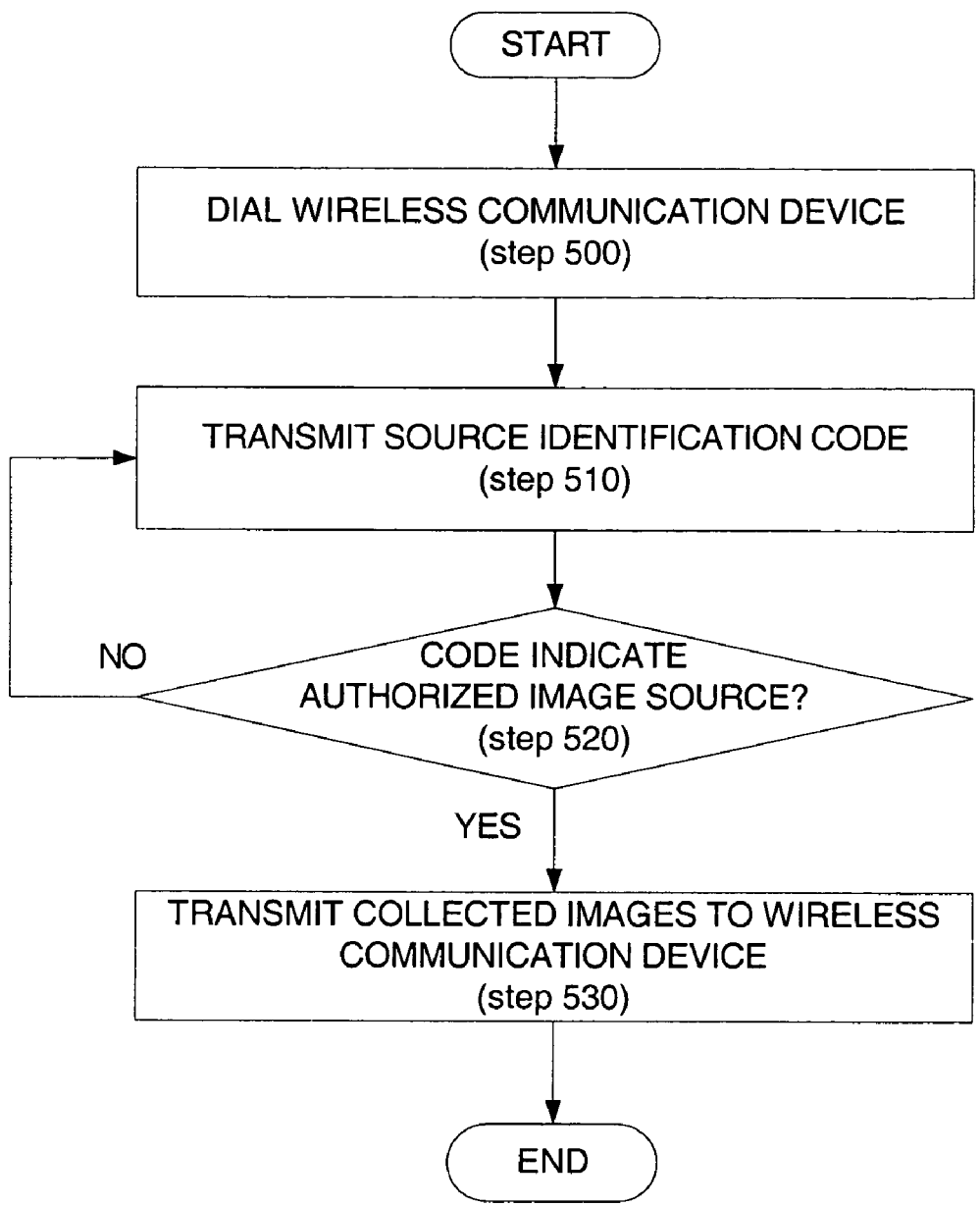
FIG. 5 is a flow chart illustrating a sequence for retrieving surveillance images according to one exemplary embodiment.

According to one exemplary embodiment, the image transmission performed during the alarm sequence illustrated in FIG. 4 includes real time image transmission without the use of the Internet. According to this exemplary embodiment, illustrated in FIG. 5, once the wireless communication device has been contacted by the monitoring control unit (step 500), the monitoring control unit transmits a source identification code (step 510). According to one exemplary embodiment, the source identification code is the ESN stored in the data storage device (230; FIG. 2) of the monitoring control unit (110; FIG. 2) during production. The electronic serial number or ESN is a unique number assigned to each monitoring control unit. Once the source identification code is transmitted (step 510), the mobile telecommunications switching office (130; FIG. 1) determines whether the code entered indicates an authorized image source (step 520). Determination of whether the code entered indicates an authorized image source may be performed according to a number of methods. According to one exemplary embodiment, the code entered may be checked against a lookup table of authorized image sources accessible by the mobile telecommunications switching office (130; FIG. 1). If the identification code is not recognized as an authorized image source (NO, step 520), the identification code is re-sent (step 510). However, once the identification code is recognized as indicating an authorized image source (YES, step 520), the wireless communication device (150; FIG. 1) is allowed to receive the transmission of the collected images (step 530) and display them thereon. Alternatively, the determination of whether the identification code indicates an authorized image source (step 520), may be performed by the mobile communication device (150; FIG. 1).

The transmission of the collected images (step 530) is performed from the monitoring control unit (110; FIG. 1), over the standard telephone line (120; FIG. 1) and telephone exchanges (114, 118; FIG. 1) to the mobile telecommunications switching office (130; FIG. 1). In contrast to image transmission systems that incorporate the Internet, the mobile telecommunications switching office (130; FIG. 1) completes the connection to the wireless communication device over the RF link (140; FIG. 1) in real time as if it were a voice call. In other words, the present system and method transmit the generated images over a private network. Often, the transmission of images over an Internet connection depends on the quantity of traffic or requests being made on a specific server. Consequently, transmission of an image over the Internet may be delayed by as much as 30 minutes in high traffic situations. However, because the present exemplary system and method incorporates a private network or a direct link between the monitoring control unit (110; FIG. 1) and the wireless communication device (150; FIG. 1), images of the area of interest may be transmitted in real time, having very little, if any, temporal delay.

Figure 6:
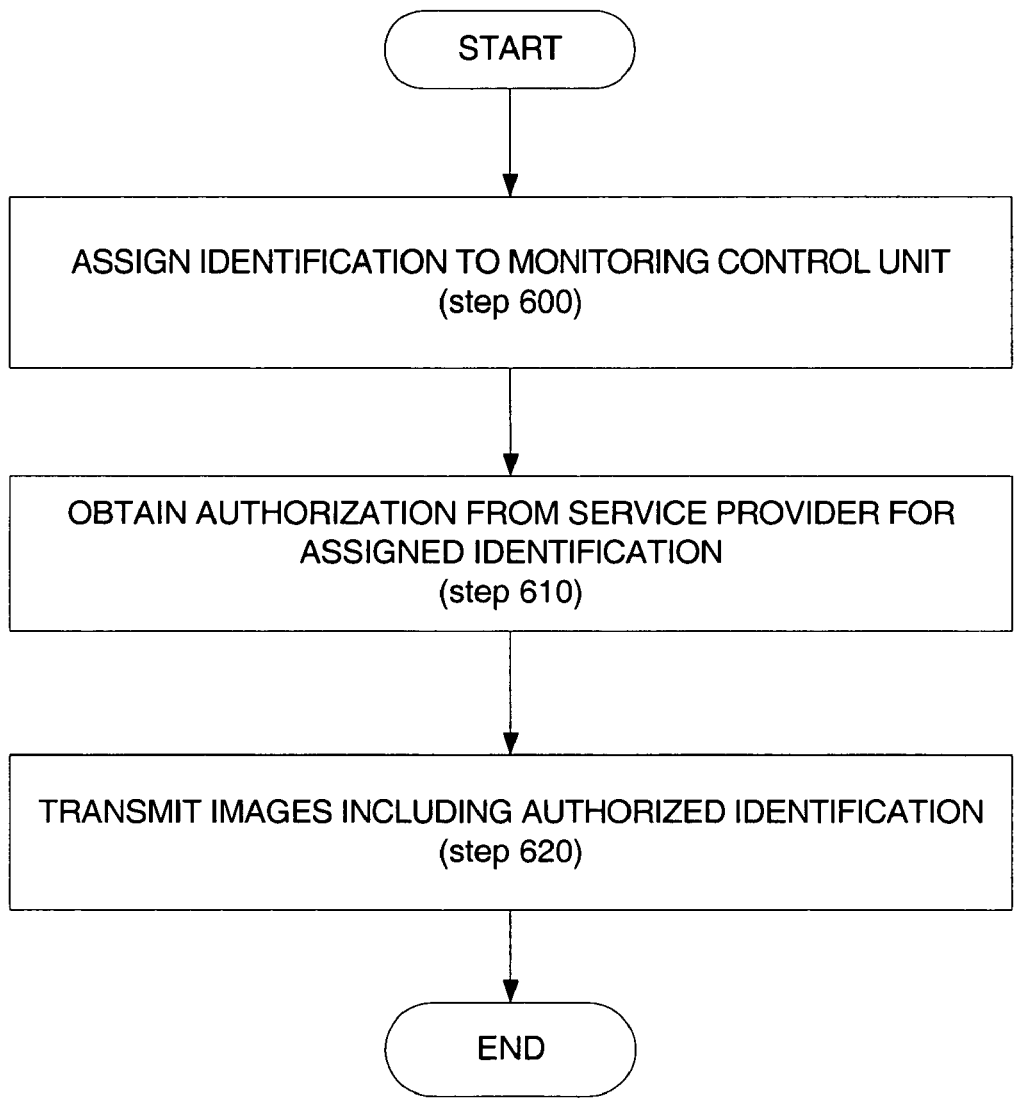
FIG. 6 is a flow chart illustrating a method for assuring data transfer between a surveillance device and a wireless image producing device according to one exemplary embodiment.

In an attempt to prevent viruses and other potentially damaging programs from affecting their networks, service providers have traditionally required image transfer to be performed within a single service network. In other words, traditional service providers have not allowed external image sources to be transmitted over their service network for fear of contamination. Rather, images were required to be received from an approved website or wireless device. Accordingly, the present system and method includes gaining prior approval from service network providers such that images generated and transmitted by the present monitoring control unit are considered approved websites or devices, authorized to transmit images over the network. FIG. 6 illustrates a method for gaining approval from a network service provider according to one exemplary embodiment.

As illustrated in FIG. 6, the present method begins by assigning a unique identification to a monitoring control unit (step 600). As noted previously, the assignment of the unique identification may be performed, according to one exemplary embodiment, during the manufacture of the monitoring control unit. By burning the unique identification, control instructions, and software associated with the wireless communication device into the ROM portion of the data storage device (230; FIG. 2) of the present monitoring control unit (110; FIG. 2), the service providers are assured of security in transmission.

Once the unique identification has been assigned, authorization for the unique identification to represent an image approved source is obtained from the service provider (step 610). The authorization obtained from the service provider may be received directly from the service provider, or alternatively, a proposed identification may be sent to and approved by the service provider. Regardless of the method used to acquire the authorization, approval by the service provider means that the service provider and the wireless communication devices coupled by the service provider will recognize the identification as an authorized source of images and allow data transmission there between.

According to one exemplary embodiment, authorization of the unique identification designates the monitoring control unit (110) as an authorized private web site for downloading image data. Consequently, when surveillance image data is sent to the wireless communication device, it recognizes the data as a format readily accepted by its circuitry and software, even though the image data is actually transmitted over a private network.

Once the unique identification has been authorized by a plurality of service providers, the authorized identification is transmitted with each image as illustrated above to provide access to the images through the service provider (step 620).

In conclusion, the present system and method provides a system and a method for remotely monitoring an area of interest. More specifically, the present system and method provide real time images of an area of interest by designating a monitoring control unit as an authorized image source, regardless of the wireless service provider being used. By designating the monitoring control unit as an authorized image source, images may be transmitted to a wireless device over a private network without the aid of the Internet. Consequently, images may be received in real time thereby increasing the protection offered by the system.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for remotely monitoring a residence comprising:
   generating a trigger initialized digital linage in a surveillance device;
   transmitting a trigger alert signal directly to a wireless communication device over a private network; and enabling an image transmission between said surveillance device and said wireless communication device regardless of a service provider of said wireless communication device.

2. The method of claim 1, wherein said transmitting a trigger alert signal over a private network comprises:

transmitting said trigger alert signal from said surveillance device to a telephone exchange over a standard telephone line;

transmitting said trigger alert signal from said telephone exchange to a mobile telecommunications switching office; and transmitting said trigger alert signal from said mobile telecommunications switching office to said wireless communication device over a radio frequency (RE) network.

3. The method of claim 1, wherein said trigger initialized digital image is generated in response to an input received from a sensor, wherein said sensor comprises one of an optical sensor, an infrared sensor, an ultraviolet sensor, an open circuit sensor, or a closed circuit sensor.

4. The method of claim 1, further comprising transmitting said trigger initialized digital image to said wireless communication device.

5. The method of claim 1, wherein said enabling an image transmission between said surveillance device and said cell phone regardless of a service provider comprises:

assigning a unique identification to said surveillance device; and obtaining recognition from a plurality of service providers of said unique identification as an approved image source.

6. The method of claim 5, wherein said unique identification comprises an electronic serial number (ESN).

7. The method of claim 5, further comprising transmitting said unique identification with said surveillance image data.

8. The method of claim 5, wherein said obtaining recognition from a plurality of service providers of said unique identification as an approved image source comprises designating said unique identification as an authorized private website for downloading images.

* * * * *

UNITED STATES PATENT AND TRADEMARK OFFICE
CERTIFICATE OF CORRECTION

PATENT NO. : 7,680,484 B2 Page 1 of 1
APPLICATION NO. : 10/779413
DATED : March 16, 2010
INVENTOR(S) : Edwin A. Kauppila It is certified that error appears in the above-identified patent and that said Letters Patent is hereby corrected as shown below:

Column 10, Line 64, Claim 1, change "digital linage in a surveillance" to "digital image in a surveillance"

Column 11, Line 15, Claim 2, change "over a radio frequency (RE) network" to "over a radio frequency (RF) network"

Signed and Sealed this

Twenty-seventh Day of July, 2010

David J. Kappos
*Director of the United States Patent and Trademark Office*